DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 10

T949,009

STABILIZATION OF ELASTOMERS AND THE ELASTOMERS THUS STABILIZED

John William Fieldhouse, Grant Crane, and Edward Leo Kay, Akron, Ohio, assignors to The Firestone Tire & Rubber Company, Akron, Ohio

Continuation of abandoned application Ser. No. 528,514, Nov. 29, 1974, which is a continuation of abandoned application Ser. No. 365,380, May 30, 1973. This application Sept. 11, 1975, Ser. No. 612,610

**Int. Cl.[2] C08J *11/04***

U.S. Cl. 260—2.3

No Drawing. 17 Pages Specification

Elastomers, such as natural rubber, homopolymers of butadiene or isoprene, copolymers of butadiene and/or isoprene optionally with styrene or acrylonitrile, and terpolymers from ethylene, propylene and a diene monomer, are stabilized with from 0.5 to 25 parts by weight per 100 parts of elastomer of a solubilized reclaimed rubber. The solubilized reclaimed rubber is produced by treating scrap vulcanized rubber with a hydrocarbon solvent at 400° to 700° F. for from 0.1 to 50 hours.